US007146352B2

(12) United States Patent
Brundage et al.

(10) Patent No.: US 7,146,352 B2
(45) Date of Patent: Dec. 5, 2006

(54) QUERY OPTIMIZER SYSTEM AND METHOD

(75) Inventors: Michael L. Brundage, Kirkland, WA (US); Andrew E. Kimball, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 10/601,480

(22) Filed: Jun. 23, 2003

(65) Prior Publication Data

US 2005/0004892 A1    Jan. 6, 2005

(51) Int. Cl.
*G06F 17/30* (2006.01)
(52) U.S. Cl. ............... 707/2; 707/102; 707/3
(58) Field of Classification Search .............. 707/2, 707/3, 4, 100, 102
See application file for complete search history.

(56) References Cited

U.S. PATENT DOCUMENTS

| 6,006,214 A * | 12/1999 | Carey et al. ............... 707/2 |
| 6,526,403 B1 * | 2/2003 | Lin et al. .................. 707/4 |
| 6,654,734 B1 * | 11/2003 | Mani et al. ............... 707/2 |
| 6,725,212 B1 * | 4/2004 | Couch et al. .............. 707/2 |
| 6,915,290 B1 * | 7/2005 | Bestgen et al. ............ 707/2 |
| 6,934,712 B1 * | 8/2005 | Kiernan et al. ........... 707/102 |

FOREIGN PATENT DOCUMENTS

WO    WO 02/35395 A2    5/2002

OTHER PUBLICATIONS

Zhang, X. et al. "Honey, I Shrunk the XQuery!- An XML Algebra ptimization Approach", *Proceedings of the International Workshop on Web Information and Data Management*, 2002, 1-14, XP-002316448.
Zhang, X., et al., "Rainbow: Multi-XQuery Optimization Using Materialized XML News", *SIGMOD*, Jun. 9, 2003, 1 page, XP-002316449.
Chun-Nan, H. et al., "Semantic Query Optimization for Query Plans of Heterogeneous Multidatabase Systems", *IEEE Transactions on Knowledge and Data Engineering*, 2000, 959-978.
Lee, C. et al., "Query Optimization in Multidatabase Systems Considering Schema Conflicts", *IEEE Transactions on Knowledge and Data Engineering*, 1997, 941-955.

(Continued)

*Primary Examiner*—Tim Vo
*Assistant Examiner*—Dangelino Gortayo
(74) *Attorney, Agent, or Firm*—Woodcock Washburn LLP

(57) ABSTRACT

An optimizer/normalizer is used to generate optimized intermediate language representation of an input query, such as an XML input query. A method of optimization of an input query in intermediate language form includes receiving the input query, examining the nodes in a left-depth first manner to identify code patterns and node types which are subjects for optimization, tagging the identified code patterns until the intermediate language representation of the input query has been examined in its entirety, searching from the top of the intermediate language representation for tagged code patterns, and adjusting the tagged code patterns with improved code patterns to form an optimal representation for an input query. The input to the optimizer/normalizer is assumed to be an input query transformed into an intermediate language representation containing code patterns and nodes, each node having a respective node type.

12 Claims, 6 Drawing Sheets

OTHER PUBLICATIONS

Grinev, M. et al., "Towards an Exhaustive Set of Rewriting Rules for XQuery Optimization: BizQuery Experience", www.ispras.ru/~grinev,*Institute for System Programming of Russian Academy of Sciences,* 17 pages.

McHugh, J. et al., "Query Optimization for XML", *Proceedigns of the 25th VLDB Conference,* Edinburgh, Scotland, 1999, 315-326.

Wu, Y. et al., "Structural Join Order Selection for XML Query Optimization", 1 thru 12.

* cited by examiner

510

```
<Qil>
  <DocOrderDistinct>
    <Tuple>
      <For id="$a">
        <Content>
          <XmlContext />
        </Content>
      </For>
      <And>
        <IsType>
          <TargetType>One;Node;None;
Element;True</TargetType>
          <RefTo id="$a" />
        </IsType>
        <Eq>
          <NameOf>
            <RefTo id="$a" />
          </NameOf>
          <LiteralQName local-name="a"/>
        </Eq>
      </And>
      <Tuple>
        <For id="$b">
          <Content>
            <RefTo id="$a" />
          </Content>
        </For>
        <And>
          <IsType>
            <TargetType>One;Node;
None;Element;True</TargetType>
            <RefTo id="$b" />
          </IsType>
          <Eq>
            <NameOf>
              <RefTo id="$b" />
            </NameOf>
            <LiteralQName local-name="b"/>
          </Eq>
        </And>
        <Tuple>
          <For id="$c">
            <Parent>
              <RefTo id="$b" />
            </Parent>
          </For>
          <True />
          <RefTo id="$c" />
        </Tuple>
      </Tuple>
    </Tuple>
  </DocOrderDistinct>
</Qil>
```

— 515

520

```
<Qil>
  <DocOrderDistinct>
    <Tuple>
      <For id="$a">
        <Content>
          <XmlContext />
        </Content>
      </For>
      <And>
        <And>
          <IsType>
            <TargetType>One;Node;None;
Element;True</TargetType>
            <RefTo id="$a" />
          </IsType>
          <Eq>
            <NameOf>
              <RefTo id="$a" />
            </NameOf>
            <LiteralQName local-name="a"/>
          </Eq>
        </And>
        <Not>
          <IsEmpty>
            <Tuple>
              <For id="$b">
                <Content>
                  <RefTo id="$a" />
                </Content>
              </For>
              <And>
                <IsType>
                  <TargetType>One;Node;
None;Element;True</TargetType>
                  <RefTo id="$b" />
                </IsType>
                <Eq>
                  <NameOf>
                    <RefTo id="$b" />
                  </NameOf>
                  <LiteralQName local-
name="b" />
                </Eq>
              </And>
              <RefTo id="$b" />
            </Tuple>
          </IsEmpty>
        </Not>
      </And>
      <RefTo id="$a" />
    </Tuple>
  </DocOrderDistinct>
</Qil>
```

QUERY OPTIMIZER SYSTEM AND METHOD

FIELD OF THE INVENTION

The invention relates generally to the field of optimization of software queries, and more particularly to optimizations for XML query languages and view definition languages.

BACKGROUND OF THE INVENTION

Language optimization is a goal of every programmer. Efficient code runs quicker, consumes less computer resources and is more compact. These attributes are attractive to consumers of code that desire good performance of their computer hardware and software. The goal of code optimization is desirable of most applications, including query language applications where the code may be used to query over large databases such as relational databases. The problem becomes more acute when a system for query execution takes on the task of querying over multiple databases using multiple languages. In this scenario, efficient code generation benefits the query by returning query results both more quickly and more consistently than non-optimized code. One example of an optimization need is in a system where XML-related language queries, such as XSLT, XQuery and XPath or view definition languages, may be input into a system for the execution of queries over a SQL database. In such a system the role of an optimizer is to improve execution code efficiency.

XML queries pose at least four barriers to normalization and optimization; node identity, ordering, side-effects and construction. A common technique in database and functional programming optimization is to eliminate variables by performing substitution. However, great care must be exercised when performing a substitution as even a simple substitution may not work well.

One problem is that many XML query languages explicitly or implicitly depend on node identity. Consider, for example, the XQuery:

let $a :=<foo/>
  return $a is $a

This XQuery constructs a single XML element, and then tests whether it has the same identity as itself. This query should return true. Contrast this with the query that would result from substitution (i.e., substituting every instance of $a with its value):

<foo/> is <foo/>

This query constructs two elements, which are then different from each other so the query returns false. The problem may become even more pronounced with operators that implicitly sort by document order or eliminate duplicate nodes by identity.

Another complication in normalization and optimization is that XML is ordered. It is desirable that this ordering be stable across document instances. Consider the following example of a code-motion technique. This example involves pushing expressions inside a loop or pulling them out of a loop when they are independent of the loop.

Given the query:
  for $i in $e1
  where $condition1
  return
  for $j in $e2
  where $condition2
  return $k A typical rewrite may result in:
  for $i in $e1
  for $j in $e2
  where $condition1
  and $condition2
  return $k The effect of this rewrite is adverse upon the ordering and position of the results. Although this rewrite seems correct at first glance, the inner condition may refer to the position within that loop, which the rewrite has altered. Any optimization that would cause an expression to have a different order should only be applied when the position need not be preserved. Otherwise, erroneous rewrites occur.

A common technique in programming language optimization is to eliminate temporary expressions when their results are not needed. However, elimination of even temporary XML query language expressions may not be completely side-effect free. Some expressions may terminate evaluation with an error, such as XQuery's error( ) function. Others may send a message to output, such as XSLT's <xsl:message/> operator. Some temporary expressions can be eliminated only if the query language semantics allow it. As two examples, consider the XQuery error( ) and false( ), and the XSLT path expression:

document('malformed.xml')//foo[false( )]

A strict implementation of these languages might require that both errors be reported, even though an optimizer would like to eliminate both expressions due to the always false( ) condition. Fortunately, XQuery allows the AND operator to short-circuit even when one of its operands may error. XSLT allows the document( ) function to return the empty list when attempting to process such an error. So, both expressions may be optimized at compile-time into the empty list. Consider an XQuery expression such as:

(<x dupe="1" dupe="2">can you get here?</x>)//text( )

In this example, an optimizer may want to eliminate the invalid temporary element and return only the text node. Notice also that if these queries are not optimized, they will produce errors at run-time, but when optimized they may not. In commercial implementations, interoperability with other programming languages may be paramount. However, calling a function written in another programming language may cause unknown effects, including possibly side-effects, which can be a barrier to optimization.

Another complication is that faulty construction of XML may have undesirable side-effects. XML construction normally implies copying its contents and this alteration to node identity should be preserved through rewrites and execution. Consider the XQuery:

foo((<x><y/></x>)//y)

This query invokes a function foo( ) by passing it the result of the expression (<x><y/></x>)//y, which is just the <y/> element. An optimizer would like to eliminate the apparently unnecessary XML construction and navigation and pass only the <y/> element that is selected. However, if foo( ) attempts to access the parent node and defines the function:

foo($y) {$y/..} and if the optimizer has eliminated <x>, then this query would produce the wrong results. It appears desirable that constructed XML being passed to external functions be preserved in its entirety to avoid construction problems. Similar problems occur for namespace declarations in scope, such as (<x:x xmlns:x="x"><y/></x>)//y and other meta-data instructions that may appear in a temporary XML expression. In languages like XSLT, construction side-effects may be of less concern because the language is not compositional, but such construction issues do significantly affect the optimization of languages like XQuery or when performing XML queries over constructed XML views.

Thus it would be advantageous for an XML optimizer to avoid false substitutions, to avoid rewrites that alter the order of rewritten expressions when order is important in an optimized XML expression, to avoid side-effects from temporary expression elimination and multiple language use and to avoid construction problems. The invention addresses the aforementioned needs and solves them with various systems, methods and techniques that also offer other advantages for optimizing queries.

SUMMARY OF THE INVENTION

The invention is directed to an optimizer/normalizer, and related techniques, which generate optimized intermediate language representation of an input query, such as an XML input query. The invention may be utilized as either a stand alone optimizer or as part of a larger system involving an XML query runtime system, for example.

The invention includes a first exemplary method for constructing an optimal representation for an input query by receiving the input query, examining the nodes in a left-depth first manner to identify code patterns and node types which are subjects for optimization, tagging the identified code patterns until the intermediate language representation of the input query has been examined in its entirety, searching from the top of the intermediate language representation for tagged code patterns, and adjusting the tagged code patterns with improved code patterns to form an optimal representation for an input query. The input to the optimizer/normalizer is assumed to be an input query transformed into an intermediate language representation containing code patterns and nodes, each node having a respective node type.

A second exemplary method for constructing an optimal representation for an input query includes receiving the input query, examining the nodes to inspect code patterns associated with respective node types, comparing the inspected code patterns using a pattern match algorithm to detect non-optimized code patterns, and adjusting one or more of the non-optimized code patterns and the inspected code patterns with improved code patterns to form an optimal representation for an input query. Once again, the input query is an intermediate language representation containing nodes, each node having a respective node type.

The invention may be embodied in an exemplary system which includes an XML-centric runtime query processing methodology. The methodology involves taking multiple XML queries and translating them into an intermediate language representation, performing optimization, and then compiling the queries back into a form compatible with the data source format.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 illustrates an intermediate language optimization example corresponding to an embodiment of the invention.

DETAILED DESCRIPTION OF ILLUSTRATIVE EMBODIMENTS

Optimizer/Normalizer Overview

An exemplary query optimizer/normalizer improves query efficiency by eliminating redundant forms and improving query execution speed. An exemplary normalizer function eliminates redundant forms and therefore simplifies back-end compiler implementations by reducing the number of kinds of queries the back ends have to be prepared to process. Better system performance is thereby achieved. The optimizer/normalizer may be designed to be used as a standalone component or as part of a larger system.

The problem of false substitution in optimization is avoided by not performing substitution or other rewrites that are incorrect in the face of node identity. This is performed by utilizing a node oriented intermediate language representation of a query as an input. Thus node characteristics may be analyzed as part of the optimization process. A rewrite of a portion of the intermediate language representation of an input query is preferably performed only when re-ordering will have no effect on any subexpressions in the intermediate representation. The order of an expression is desirably unaffected by clearly identifying order sensitive expressions via the use of an unambiguous intermediate language representation of an input query. Overall, optimization errors and related complications may be avoided through a combination of optimization barriers, explicit operators and careful attention to well-authored rewrite rules.

The invention may be implemented in one or more of a set of hardware elements and software elements in a computer system. As such, an exemplary computer system which may include the invention is described hereinbelow.

Exemplary Computing Device

Figure 1:
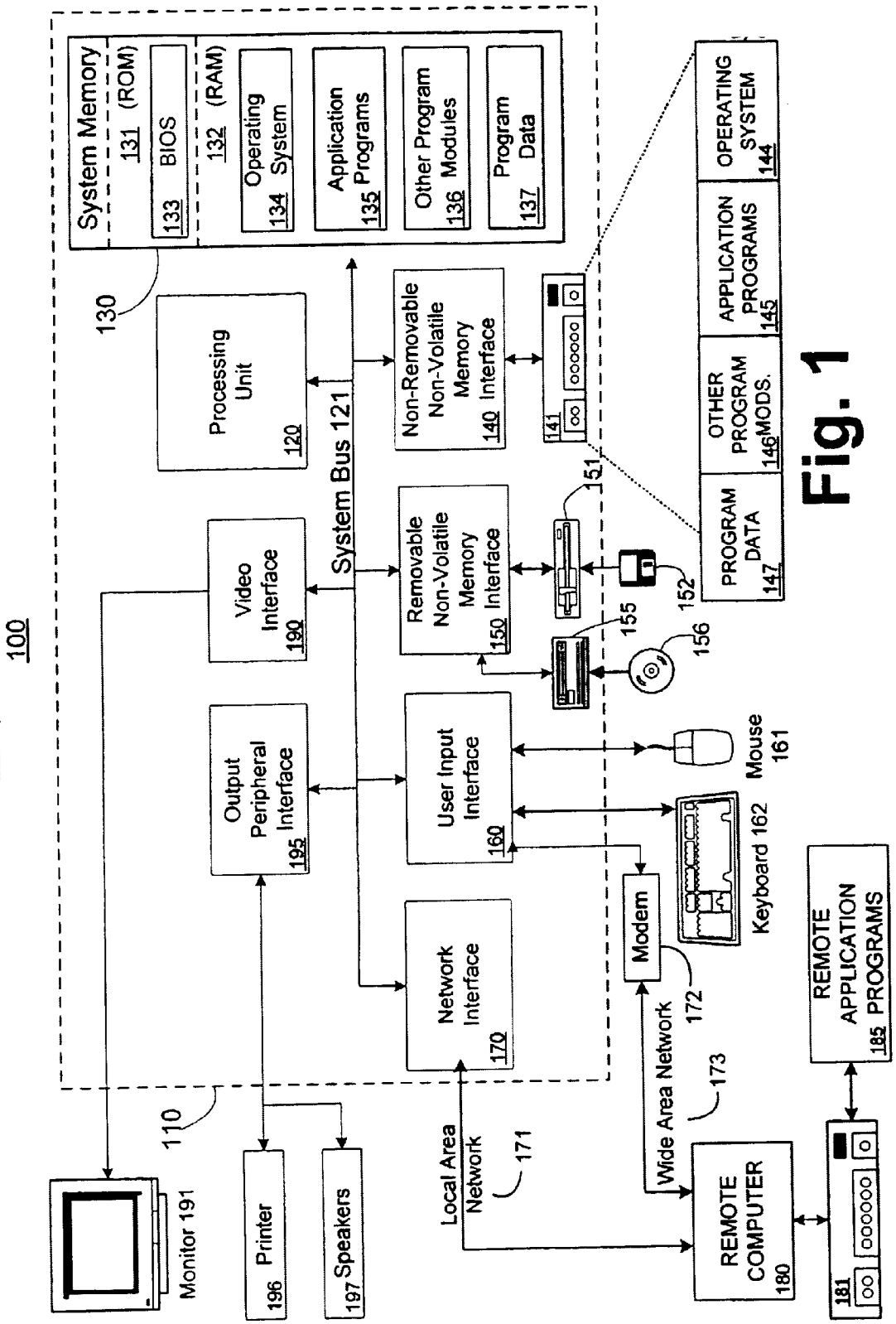
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, One Microsoft Way, Redmond, Wash. 98052, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Optimization Discussion and Exemplary Embodiments of the Invention

Two main sources of inefficiency in XML queries are buffering and type conversions. Buffering occurs when an operator cannot be streamed, and instead some data much be cached in memory and then traversed one or more times in order to evaluate the operator. When this occurs, pipeline processing may halt and memory allocations and multiple passes may occur. Turning queries that operate over data twice into queries that operate over it only once is therefore a desired optimization.

Buffering is mostly an aspect of the physical query plan, tightly coupled to how the query is implemented. However, there are patterns in the logical query plan that can be detected and rewritten. For example, the query sum($x)div count($x) may be equivalent to avg($x). The former expression requires evaluating $x twice, while the latter can perform its computation in a single pass.

In XML, type conversions generally involve going from a string representation to a machine type (like integer) or vice-versa. Relational databases traditionally do not optimize such queries well, because they are relatively uncommon in the relational domain where data is already stored as machine types. In the implementation of XML queries, it may be considered desirable to remove as many type conversions and type tests as possible, especially over relational data, but even for ordinary XML data.

For example, the query Customer [@CustomerID='ALFKI'] implicitly may demand converting the CustomerID node to string. If this node is already typed as xs:string, then no conversion is required, although the string value of the node may still be retrieved. If the node is mapped to a column that has a SQL type such as nvarchar, then no conversion from relational data to XML data is needed either. Eliminating these two type conversions causes the SQL query plan to go from an index scan to an index seek, assuming CustomerID is indexed. This plan may reach upwards to a 10× performance improvement.

These optimizations are generally physical in nature. Although unnecessary SQL/XML conversions may be eliminated, there are some optimizations that are already possible in the logical query plan. One approach may be to eliminate type conversions and type tests by refining types during the optimization process. The more precisely static type information is known and understood concerning a query, the more operators may be statically eliminated.

An embodiment of the invention utilizes an intermediate language representation having a graph structure composed of nodes identifying functional operations in a query. As such, it represents the semantic meaning of a query. This intermediate language is a query intermediate language and is termed QIL. An example query intermediate language definition is provided in a co-filed patent application entitled QUERY INTERMEDIATE LANGUAGE METHOD AND SYSTEM assigned to Microsoft Corporation of Redmond, WA (Ser. No. 10/601,444, filed on Jun. 23, 2003). The contents of that co-filed application are considered to be incorporated in its entirety by reference into this application.

Pattern detection is used to identify candidates for normalization and optimization. The patterns developed by such an intermediate language are not of an arbitrary complexity. Generally, the patterns are mostly shallow patterns and are rooted at a particular node type and all back-edges are constrained to occur in known locations. Consequently, a pattern match algorithm can easily accommodate this representation.

The XML intermediate language termed QIL is a representation of an XML query or view. The query intermediate language is an explicit representation of the meaning of an XML query. The query intermediate language may be viewed as a semantic representation common across all XML query and view language compilers. QIL is similar to an ordinary abstract syntax tree (AST) but different in that QIL captures not the syntax of the language but the semantics, or meaning, of a query. Another difference is that QIL is a graph structure and not a tree structure like AST.

QIL enables the abstraction of multiple different XML query languages and view definition languages (such as XPath, XSLT, and XQuery) over a variety of different target data sources (such as relational and non-relational data). As such, QIL enables a common construction to support all of the compatible XML languages. Every operation is both explicit and unambiguous.

The patterns that are generated by QIL and detected by the optimizer are grouped by root node type and then used to generate a subclass for pattern identification and optimization implementation. These subclasses perform a left-depth first (i.e., bottom-up) pass over the QIL graph, attempting to match each pattern in turn for a given node type. If no pattern matches, it copies the node (and its entire subgraph, which has already been visited); otherwise, it performs the indicated optimization replacement. This approach has worst-case complexity $O(gn^2)$ where g is the number of patterns in the grammar and n is the number of nodes in the graph. The optimizer views each node and all descendants to match each pattern, although in practice, patterns tend to be only a single level deep so its average time is more accurately approximated as $O(gn)$.

Figure 2:
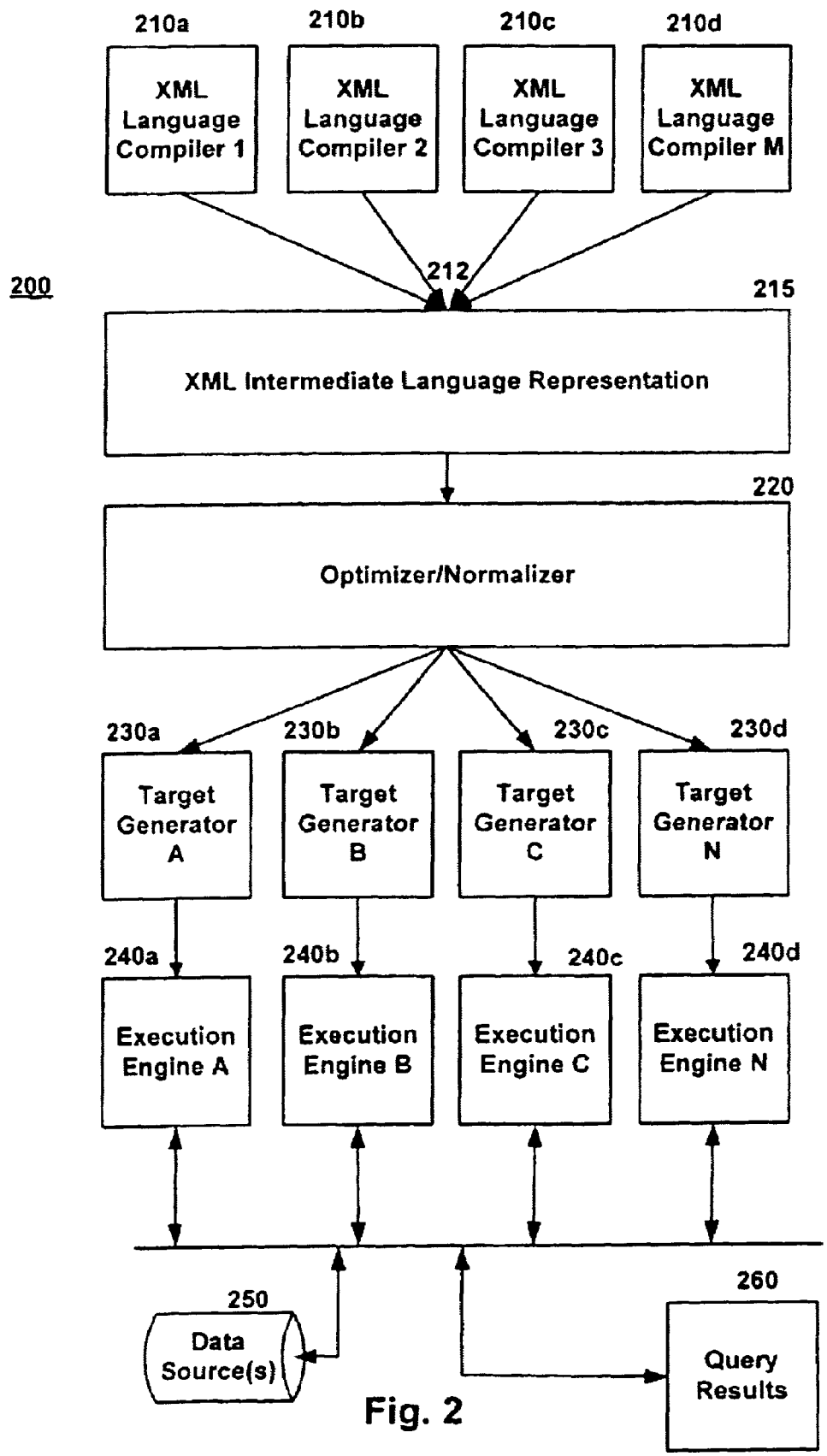
FIG. 2 depicts an exemplary block diagram architecture in which aspects of the invention may be implemented.

FIG. 2 depicts a block diagram of an exemplary system architecture embodying aspects of the current invention. A query runtime architecture 200, including intermediate language compilers and target execution engines, is shown. The architecture depicts the exemplary basic blocks implemented to receive, compile, interpret and access data for XML queries upon multiple data sources. A plurality of front-end language compilers 210 may be realized which comport with XML or XML related standards. The original or input query may be received or input from any one of a plurality of input devices such as are shown in FIG. 1.

Returning to FIG. 2, the front-end compilers 210 may receive an XML query, XML view, or other related XML language inquiries via an input device (not shown in FIG. 2) and produce a compiled XML intermediate language representation 215 of the meaning of the composite of the input queries. Typical language types for the front-end compilers 210 include the world wide web consortium (W3C®) published standards of XPath, XML Stylesheet Language (XSL), XSLT and XML Query Language (XQuery). An XML view compiler may also be present and include the W3C® XML standard view of XQuery, among others. The intermediate language abstraction between query and view languages and multiple target models allows real XML data, such as from the Microsoft® .NET™ as well as virtual XML data, to be used as data sources.

The XML intermediate language representation 215 is input to a query optimizer/normalizer 220. The function of the optimizer is to improve query performance and eliminate redundant forms within the input intermediate language representation. The optimizer serves to increase system performance by implementing numerous algorithms that reduce the size and decrease the complexity of the XML intermediate language representation prior to the delivery of the optimized XML query representation to the back-end target generators 230.

There may be a plurality of back-end target generators 230 to support a multiplicity of related target query language execution engines 240. Each of the back-end target generators 230 may be constructed so that they efficiently work on data sources comporting with the model of the data within each supported data source. For example, a target query language generator for a SQL database source may be optimized for efficiency in querying over a relational database with a SQL database management system. Thus, for example, target query language generator 230a may also be paired with an execution engine 240a to transform the intermediate language representation 215 into a target machine language compatible with a specific data source 250. Optionally, a target generator may also transform an XML intermediate language representation 215 into another intermediate language, such as for example Microsoft® intermediate language (MSIL), so that an execution engine may directly query one or more data sources 250.

Upon execution of the compiled query, the execution engine normally produces query results 260 available for further processing, storage, display to a user, or provision to a subsequent software application, for example. The target compilers 230 and corresponding execution engines 240 may include such query languages as XML and SQL, to name a few.

Another aspect of the architecture is the modularity of data availability. For example, at the point where the optimized XML query representation is generated (e.g., inputs to target generators 230), an output may be generated so that the optimized XML query intermediate language representation itself is available for use in another system or available for delayed target compiling. Also, the optimized XML query representation itself may be directly executed without actually converting first to a specific, non-XML instruction query. Thus, the XML intermediate language may be used to query over one or more data sources without a compiler using an execution engine specifically adapted to execute the optimized XML query intermediate language representation. As another option in system output, the target compiler output(s) may be used as an output for execution in a separate system or by another non-system application.

It should be noted that the exemplary architecture of FIG. 2 inherently allows great flexibility in constructing queries. The query architecture allows multiple queries to be input so that an optimized XML intermediate language composite of the multiple queries may be generated. Additionally, multiple back-end target compilers and execution engines may be used appropriately to query over data sources of differing data models. The architecture 200 also allows a reduction in the number of permutations of front-ends and back ends. FIG. 2 depicts M front end compilers and N back end compilers, where M and N are integers. Normally, this combination would yield a total number of possible system paths of M times N. However, because of the common intermediate language utilization, the number of permutations is advantageously reduced to M plus N.

Figure 3:
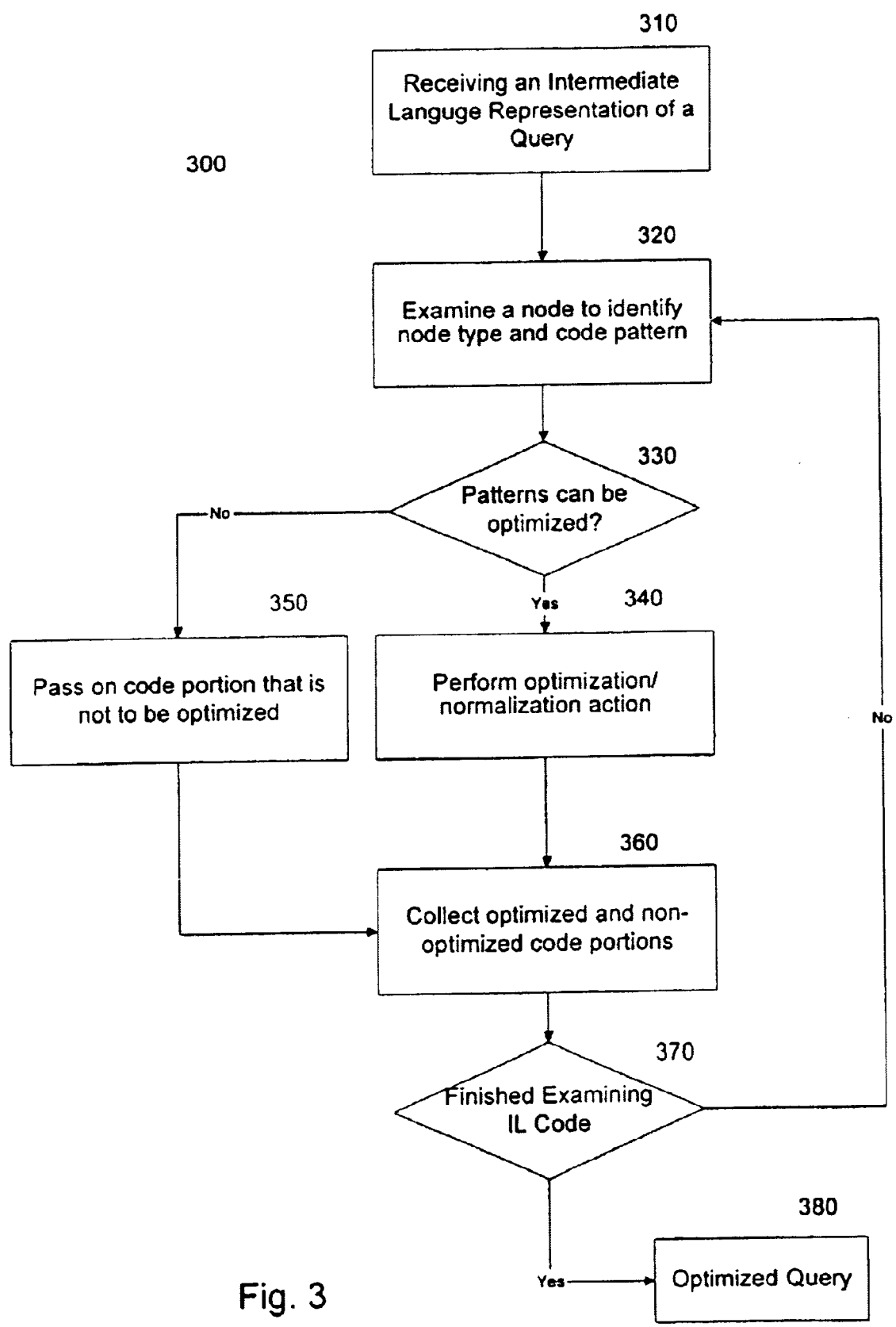
FIG. 3 illustrates a flow diagram depicting an embodiment of an optimization method of the invention.

FIG. 3 represents a flow diagram 300 for an exemplary flow of optimization in accordance with the invention. Initially, an intermediate language representation of a query is received 310. This intermediate language representation may be the query intermediate language as discussed above or it may be some other intermediate language such as MSIL. The intermediate language is assumed to be of a graph or node structure. The process 300 then examines the nodes within the intermediate language to determine node type and code pattern 320. Upon an identification of node type and code pattern, the patterns are analyzed for identification of a pattern that can be optimized 330. This comparison may be performed by comparing a pre-stored set of node types and/or code patterns that may identify a candidate for optimization. Alternately, an algorithm may be used in conjunction with a node type identification to identify code patterns for optimization.

If the detected pattern of the node type may be optimized, the code pattern is optimized 340 by replacement. Alternately, if an unnecessary repetition is detected, a normalization may occur 340 which may result in the elimination of the repetition. As a result of the normalization or optimization, the portions of changed and unchanged code are collected 360 and aggregated.

If the detected pattern of the node type may not be optimized 330 because it does not match with a node type or code pattern, then the code that was examined may be passed on 350 so that the code can be collected 360.

Once the code is collected 360, the process 300 determines whether the intermediate language representation has been fully examined for normalization/optimization purposes. If the code has not been fully examined, the next node is examined 320 and the process of examination and optimization is replicated. If the process 300 has completed examining the intermediate language representation nodes, then the aggregated code is passed on and an optimized query results 380.

Figure 4:
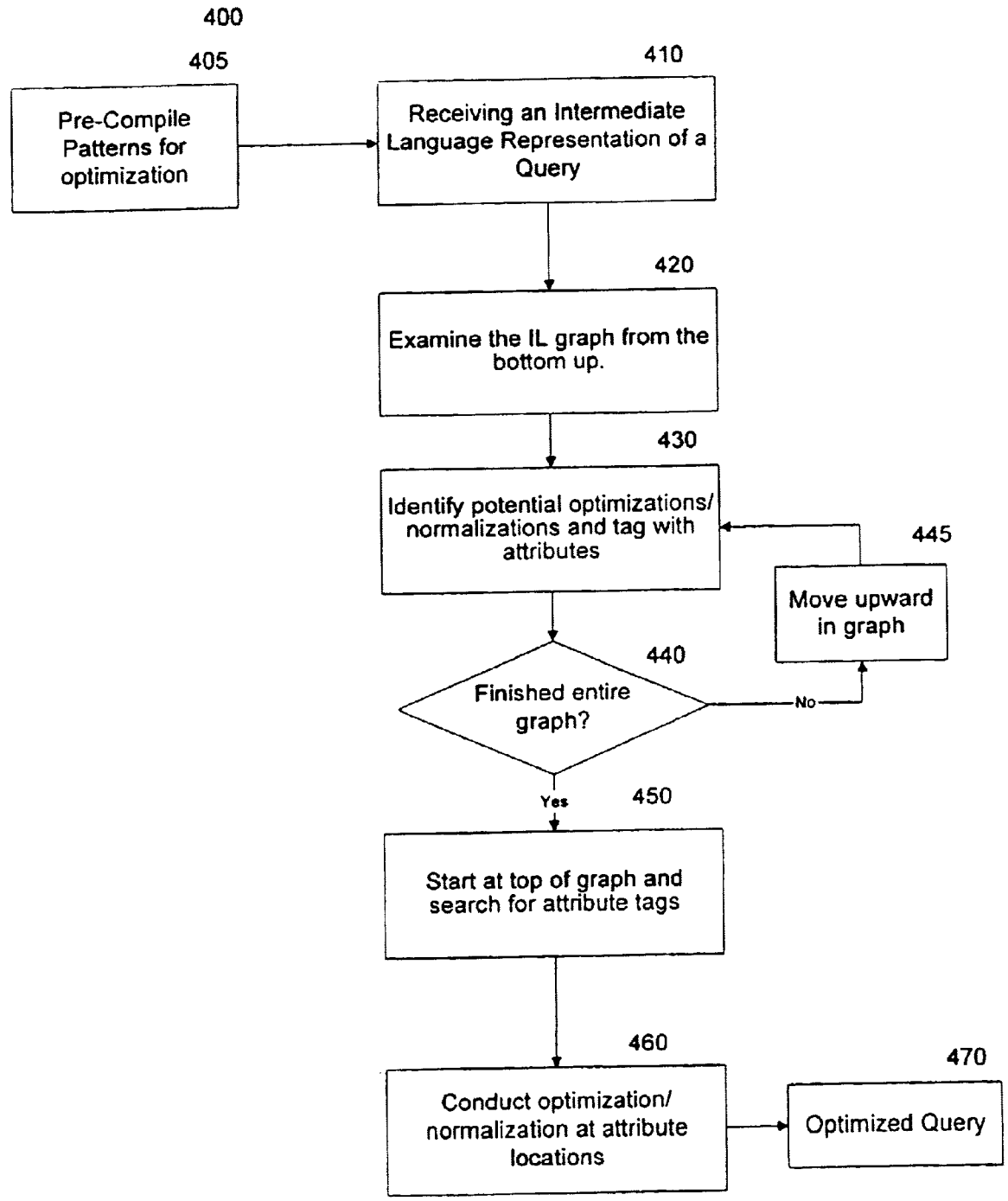
FIG. 4 illustrates a flow diagram depicting an alternate embodiment of an optimization method of the invention.

FIG. 4 is a flow diagram of an exemplary process 400 that may be utilized as an alternative to that of process of FIG. 3 for optimization and normalization. Initially, pre-compiled patterns for optimization 405 may be stored in an accessible memory store. The process 400 then may receive an intermediate language representation 410. As before, the intermediate language representation may be QIL, MSIL, or some other graph or node type of representation. Here, the intermediate language representation is examined from the bottom of the graph 420 in an upward fashion. As each node is visited by the process 400, potential normalizations and optimizations are discovered and tagged with attributes 430. The attributes are used to identify what kind of normalization or optimization is desirable.

The process 400 then checks to see if the entire graph has been examined 440. If the process is not yet complete, then the process 400 moves upward in the graph 445 to test the next node and identify potential optimizations 430.

If the process of checking the entire graph of the intermediate representation has been completed 440, then the process 400 moves to the top of the graph and searches for attributes tagged to the nodes 450. Some of the tagged attributes may be those of normalization, such as repetitious nodes, or of optimizations, such as replacement code. The attributes may indicate the kind of action (i.e., redundancy deletion, optimization replacement, etc.) that is needed. The process 400 conducts the optimization / normalization at the tagged nodes 460 from the top down at the tagged node locations. At the end of execution of the implementation of the optimization, the entire query may be reconstructed from the node type expressions and the optimized query 470 results.

It is convenient to establish a notation to describe query rewrites in terms of the underlying intermediate language representation. Rewrites may depend on the node types involved, and occasionally additional conditions, such as conditions on types or values, may be desirable to be satisfied for a rewrite to occur. A syntax that is node-centric but allows for additional conditions to be specified is preferably used in the embodiments of the invention.

As one in the art would recognize, node names may be wrapped in parentheses, as are nodes in the LISP language. A node's children, if any, may follow its name. Thus, (X) describes a single node X while (X Y Z) describes a node X with two child nodes, Y and Z. The order of children is significant. An example of a tree expression, 1+1=2 may be written as:

(Eq (Plus (Integer 1) (Integer 1)) (Integer 2))

In a rewrite, the replacement structure may be written after the match pattern, using the token => to separate them. The entire rule is also preceded by a name in square brackets; this name may be descriptive. In one embodiment, such rules may be selectively enabled or disabled for flexibility in code optimization. An example rewrite rule may be:

[EliminateOr]
(Or (True) (False))=>(True)

A code pattern may also allow patterns to match any node kind. This is indicated using the wildcard match (*). Typically, any pattern may be labeled by preceding it with a variable ($variableName) and a colon (:). Then, the variable name may be used instead of a node elsewhere in the match pattern or in the replacement. Labels generally provide the only way to express a back-reference. An example of a graph with back-references and wildcards may be:

(Sort $i:(For (List)) (Desc (Negate $x:*)))=>(Sort $i (Asc $x))

Additional conditions may be expressed with a specific notation. A node pattern may be followed with code enclosed in curly braces. The code may refer to any variables that are in scope. An example graph with code conditions may be:

(IsEmpty $x:* {$x.IsEmpty })=>(True)

An extended Backus-Naur form (EBNF) description of the pattern grammar appears below and presents a pattern grammar.

P :=Pattern*
Pattern :=Descr Match '=>'Action
Descr :='['Ident ']'
Action :=Replace |Code
Code :='{'(Code |[^{}])* '}'
Match :=(Label ':')? (Node |Wildcard |String |Number) Code?
Label :='$'Ident
Node :='('Ident Match* ')'
Replace :=Label |PatNode
PatNode :='('Ident Action* ')'
Wildcard:='*'
Ident :=[_A-Za-z] [_A-Za-z0–9\-]*
String :='"'[^"]* '"'
Number := [0–9]+

FIG. 5 represents an example of an optimization where rewrites of expressions allow an optimization of the intermediate language code. The original code 510 is an embodiment of the query intermediate language representation of an XML query. The resulting 18. optimization 520 is the same code with specific sections re-written. For example, a dotted portion 515 of the intermediate language representation 510 may be transformed into an optimized form 520. The optimizations may be seen as dotted insertions 525 in the rewrite 520.

Figure 6:
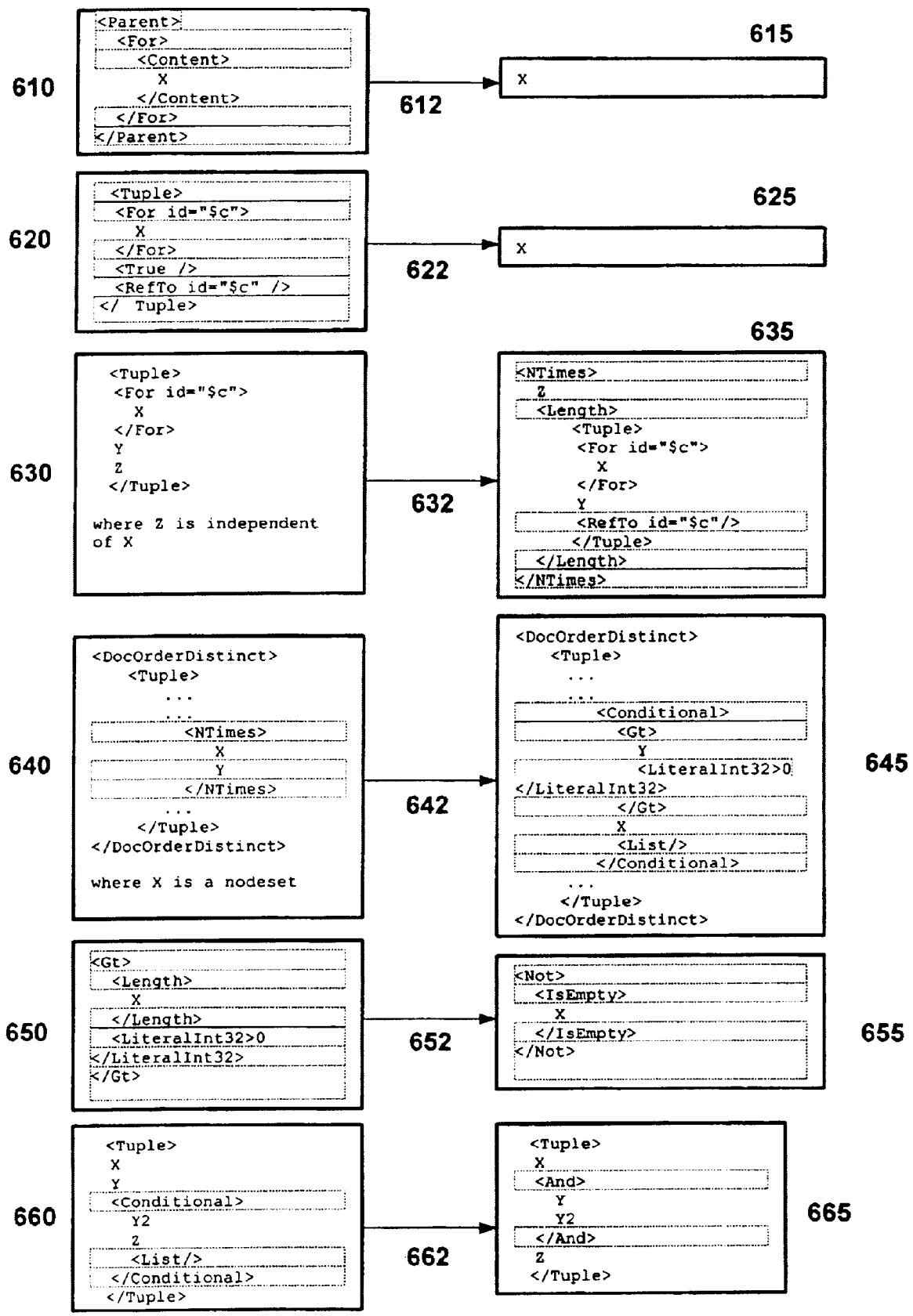
FIG. 6 illustrates a piecewise optimization of an intermediate language example corresponding to an embodiment of the invention.

Typically, rewrites such as those in FIG. 5 are not performed all at once, but instead are divided into smaller rewrites each of which manipulates some part of the graph. As depicted in FIG. 6, these smaller rewrites preferably cascade to produce the desired overall effect.

FIG. 6 is a representation of an exemplary cascading series of rewrites. A first section of original text 610 may be rewritten as an optimization 615 using the transformation 612 via the elimination of parents depicted by the rule:

[EliminateParent]
(Parent (For (Content $x:*)))=>$x

A next section of the intermediate code representation 620 may then be rewritten as an optimization 625 using the transformation 622 via the elimination of a tuple depicted by the rule:

[EliminateTuple]
(Tuple $i:(For $x:*) (True) $j:*) {$i==$j}=>$x

Further processing on the rewritten code 630 results in a rewrite 635 using a transformation 632 via a loop invariant code motion depicted by the rule:

[IntroduceNTimes]
(Tuple $i:* $w:* $r:*) {!DependsOn($r, $i)}
=>(NTimes $r (Length (Tuple $i $w $i)))

The resultant rewrite may be inserted into the query code 640 and may be further rewritten 645 using the transformation 642 via a tuple rewrite depicted by the rule:

```
[EliminateNTimes]
(DocOrderDistinct $t:(Tuple***))
=> {
    QilTuple last = $t.LastTuple;
    if (last.Return.Type == QilNodeType.NTimes) {
        QilBinary ntimes = (QilBinary)last.Return;
        QilList list = f.List( );
            list.Type = f.TypeFactory.Sequence(QilCardinal-
               ity.Zero, ntimes.Type);
            last.Return = Replace($0.EliminateNTimes, ntimes,
               f.Conditional(f.Gt(ntimes.Right, f.Int32(0)),
               ntimes.Left,list));
    }
}
```

The constructs of the resultant code when inserted into the original intermediate representation 650 may be optimized 655 further by the transformation 652 via the logical rewrite depicted by the rule:

[IntroduceExists]
(Gt (Length $x:*) (LiteralInt32 0)) =>(Not (IsEmpty $x))

A further rewrite of the total resultant code 660 may be optimized 655 by the transformation 662 of a tuple rewrite depicted by the rule:

```
[FoldTupleConditional]
(Tuple $i:* $w:* (Conditional $cond:* $return:* $list:(List)
   {$list.QilType.IsEmpty }))
=> (Tuple $i (And $w $cond) $return)
```

When the resultant 665 is inserted into the original intermediate language query 510 of FIG. 5, the resultant is the optimization as shown in the optimized intermediate code 520 of FIG. 5. Thus multiple rewrites may be used in the optimization process of the invention.

Optimization and Normalization Descriptions

Optimizations are typically classified as either local or global optimizations. Local optimizations, such as constant-folding, are performed by looking at a small connected region of the graph. Global optimizations, such as dead code elimination, are performed by looking at the entire graph. Exemplary optimizations performed in accordance with aspects of the invention are summarized below:

Constant-folding
Logical rewrites
Basic path rewrites (child, attribute)
Other path rewrites (root, parent, self, descendant, etc.)
Loop-invariant code motion
Tuple rewrites
Position rewrites
Projection rewrites
Tuple and list commutations
Benchmarks (XSLT, XMark, etc.)
Composition across function boundaries
Type folding
Function inlining
Common sub-expression elimination
Dead function elimination
Sort elimination/grouping The local normalizations performed can be grouped into several different categories: constant-folding, commutations, path rewrites, common subexpression-elimination, function inlining, and miscellaneous normalizations. Exemplary samples of the optimization rules and techniques are provided in Appendix I attached hereto.

Constant-Folding Optimizations

Constant folding involves eliminating certain compile-time constants. These optimizations reduce the query size, reduce the size of the code that will be generated, and may significantly affect performance in loop situations. Constant-folding patterns constitute the bulk of the patterns performed by the optimizer.

Logical Rewrite Optimizations

Some rewrites are not exactly constant-folding, but reduce the logical complexity of an expression. Others turn irregular forms, such as comparing two Boolean expressions which cannot be transliterated directly into SQL, into regular forms. Such regular forms perform logical operations on Boolean expressions which can be transliterated directly into SQL.

Basic Path Rewrite (Child, Attribute) Optimization

Navigation optimizations may play a role in query performance because XQuery is compositional (i.e., supporting navigation into other XQuery expressions). Paths in an intermediate language such as QIL are not generally represented with a single operator. Consequently, path rewrites may be composed of many smaller rewrites such as constant-folding patterns, such as for example, EliminateNameOf. Additionally, some path rewrites involve folding navigation operators like Content and Attribute with construction operators like ElementCtor and AttributeCtor.

Loop-invariant Code Motion Optimization

Loop-invariant code motion is a common optimization technique in which computations made in a loop that do not change during the loop (i.e., loop-invariant) can be factored out (i.e., code motion). In this way, the computation is performed only once instead of the number of iterations of the loop.

Commutation Optimization

Commutations are a class of rewrites that involve unraveling iterations over collections or iterations over iterations. Such rewrites are generally commutations of the form A B => f(B) g(A); that is, A applied to B is rewritten into B applied to A or B applied to some function of A, or a list of A applied to each member of B in turn. Some commutation patterns may be too complex to express fully using a pattern language. Therefore, these patterns typically may have a match pattern followed by a code action that performs the replacement.

Tuple Rewrites

In QIL, the Tuple and Filter node types (and the legacy Tuple node type) occupy a special role, and so have special rewrites associated with them, that are not classified in any other category.

Position Rewrites

As mentioned hereinabove, preserving position may present a barrier to optimization. Therefore, eliminating the position operators is a very worthwhile optimization. Additionally, the position operator satisfies certain constraints. For example, it is always at least 1 and at most the length of the set. Additionally, certain complex patterns using position may still be rewritten in ways that preserve it.

Benchmarks

Benchmarks notoriously do not represent real-world conditions, although for an optimizer this doesn't matter much; they still represent optimization opportunities.

Sort Elimination/Grouping

Sort patterns come in two main varieties. One type of sort pattern eliminates unnecessary sorting such as, for example, applying a document order to an expression that is already in document order. Another sort pattern may recognize a grouping pattern which may be implemented by a back-end compiler using multiple passes.

As mentioned above, while exemplary embodiments of the present invention have been described in connection with various computing devices and software architectures, the underlying concepts may be applied to any computing device or system in which it is desirable to implement a code optimizer. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

Appendix I

The following appended material includes examples of optimizations that may be part of exemplary embodiments in accordance with the invention. The list is exemplary only as more examples are possible within the bounds and spirit of the invention.

| Exemplary Constant Folding Type Optimizations |
| --- |

Constant-folding patterns for Boolean operators:

1. [EliminateAnd]
   (And (True) $x:*) => $x
2. [EliminateAnd]
   (And (False) *) => (False)
3. [EliminateAnd]
   (And $x:* (True)) => $x
4. [EliminateAnd]
   (And * (False)) => (False)
5. [EliminateOr]
   (Or (True) *) => (True)
6. [EliminateOr]
   (Or (False) $x:*) => $x
7. [EliminateOr]
   (Or * (True)) => (True)
8. [EliminateOr]
   (Or $x:* (False)) => $x
9. [EliminateNot]
   (Not (True)) => (False)
10. [EliminateNot]
    (Not (False)) => (True)
11. [EliminateConditional]
    (Conditional (True) $x:* *) => $x
12. [EliminateConditional]
    (Conditional (False) * $x:*) => $x
13. [EliminateConditional]
    (Conditional $x:* (True) (False)) => $x
14. [EliminateConditional]
    (Conditional $x:* (False) (True)) => (Not $x)
15. [EliminateConditional]
    (Conditional * $x:(True) (True)) => $x
16. [EliminateConditional]
    (Conditional * $x:(False) (False)) => $x Constant-folding patterns for collection operators:

1. [FoldLengthList]
   (Length $x:*) { $x.IsEmpty } => (LiteralInt32 0)
2. [FoldLengthList]
   (Length $x:*) { $x.IsSingleton } => (LiteralInt32 1)
3. [FoldLengthList]
   (Length $x:(List)) { IsConstant($x) } => (LiteralInt32 { $x.Length })
4. [FoldLengthRange]
   (Length (Range $min:* $max:*)) => (Convert (Add (LiteralInt64 1) (Abs (Subtract $max $min))) Int32)
5. [FoldLengthNTimes]
   (Length (NTimes $x:* $n:*)) => (Multiply (Length $x) $n)
6. [EliminateList]
   (List $x:*) { $x.Count = = 1} => { $x[0] }
7. [EliminateRange]
   (Range (LiteralInt64 $x:*) (LiteralInt64 $y:*)) {$x = = $y} => $x
8. [EliminateNTimes]
   (NTimes * (LiteralInt32 0)) => (List)
9. [EliminateNTimes]
   (NTimes $x:* (LiteralInt32 1)) => $x
10. [EliminateDistinct]
    (Distinct $x:(List)) => $x
11. [EliminateDistinctByValue]
    (DistinctByValue (For $x:(List) { $x.QilType.IsEmpty }) *) => $x
12. [EliminateIntersection]
    (Intersection $x:(List) { $x.QilType.IsEmpty } *) => $x
13. [EliminateIntersection]
    (Intersection * $x:(List) { $x.QilType.IsEmpty }) => $x
14. [EliminateDifference]
    (Difference $x:(List) { $x.QilType.IsEmpty } *) => $x
15. [EliminateDifference]
    (Difference $x:* $y:(List) { $y.QilType.IsEmpty }) => $x
16. [EliminateAverage]
    (Average $x:(List) { $x.QilType.IsEmpty } ) => { f.Double(Double.NaN) }
17. [EliminateAverage]
    (Sum $x:(List) { $x.QilType.IsEmpty } ) => (LiteralDouble 0)
18. [EliminateMinimum]
    (Minimum $x:(List) { $x.QilType.IsEmpty } ) => $x
19. [EliminateMaximum]
    (Maximum $x:(List) { $x.QilType.IsEmpty } ) => $x -continued Exemplary Constant Folding Type Optimizations Constant-folding patterns for arithmetic operators:

1. [EliminateNegate]
   (Negate (LiteralDecimal $x:*)) => (LiteralDecimal { -$x })
2. [EliminateNegate]
   (Negate (LiteralDouble $x:*)) => (LiteralDouble { -$x })
3. [EliminateNegate]
   (Negate (LiteralFloat $x:*)) => (LiteralFloat { -$x })
4. [EliminateNegate]
   (Negate (LiteralInt32 $x:*)) => (LiteralInt32 { -$x })
5. [EliminateNegate]
   (Negate (LiteralInt64 $x:*)) => (LiteralInt64 { -$x })
6. [EliminateAdd]
   (Add (LiteralDecimal $x:*) (LiteralDecimal $y:*))
   => (LiteralDecimal { $x + $y })
7. [EliminateAdd]
   (Add (LiteralDouble $x:*) (LiteralDouble $y:*))
   => (LiteralDouble { $x + $y })
8. [EliminateAdd]
   (Add (LiteralFloat $x:*) (LiteralFloat $y:*))
   => (LiteralFloat { $x + $y })
9. [EliminateAdd]
   (Add (LiteralInt32 $x:*) (LiteralInt32 $y:*))
   => (LiteralInt32 { $x + $y })
10. [EliminateAdd]
    (Add (LiteralInt64 $x:*) (LiteralInt64 $y:*))
    => (LiteralInt64 { $x + $y })
11. [EliminateSubtract]
    (Subtract (LiteralDecimal $x:*) (LiteralDecimal $y:*))
    => (LiteralDecimal { $x − $y })
12. [EliminateSubtract]
    (Subtract (LiteralDouble $x:*) (LiteralDouble $y:*))
    => (LiteralDouble { $x − $y })
13. [EliminateSubtract]
    (Subtract (LiteralFloat $x:*) (LiteralFloat $y:*))
    => (LiteralFloat { $x − $y })
14. [EliminateSubtract]
    (Subtract (LiteralInt32 $x:*) (LiteralInt32 $y:*))
    => (LiteralInt32 { $x − $y })
15. [EliminateSubtract]
    (Subtract (LiteralInt64 $x:*) (LiteralInt64 $y:*))
    => (LiteralInt64 { $x − $y })
16. [EliminateMultiply]
    (Multiply (LiteralDecimal $x:*) (LiteralDecimal $y:*))
    => (LiteralDecimal { $x * $y })
17. [EliminateMultiply]
    (Multiply (LiteralDouble $x:*) (LiteralDouble $y:*))
    => (LiteralDouble { $x * $y })
18. [EliminateMultiply]
    (Multiply (LiteralFloat $x:*) (LiteralFloat $y:*))
    => (LiteralFloat { $x * $y })
19. [EliminateMultiply]
    (Multiply (LiteralInt32 $x:*) (LiteralInt32 $y:*))
    => (LiteralInt32 { $x * $y })
20. [EliminateMultiply]
    (Multiply (LiteralInt64 $x:*) (LiteralInt64 $y:*))
    => (LiteralInt64 { $x * $y })
21. [EliminateDivide]
    (Divide (LiteralDecimal $x:*) (LiteralDecimal $y:*))
    => { Divide($x, $y) }
22. [EliminateDivide]
    (Divide (LiteralDouble $x:*) (LiteralDouble $y:*))
    => { Divide($x, $y) }
23. [EliminateDivide]
    (Divide (LiteralFloat $x:*) (LiteralFloat $y:*))
    => { Divide($x, $y) }
24. [EliminateDivide]
    (Divide (LiteralInt32 $x:*) (LiteralInt32 $y:*))
    => { Divide($x, $y) }
25. [EliminateDivide]
    (Divide (LiteralInt64 $x:*) (LiteralInt64 $y:*))
    => { Divide($x, $y) }
26. [EliminateModulo]
    (Modulo (LiteralDecimal $x:*) (LiteralDecimal $y:*))
    => { Modulo($x, $y) }

-continued

| Exemplary Constant Folding Type Optimizations |
|---|

27. [EliminateModulo]
    (Modulo (LiteralDouble $x:*) (LiteralDouble $y:*))
    => { Modulo($x, $y) }
28. [EliminateModulo]
    (Modulo (LiteralFloat $x:*) (LiteralFloat $y:*))
    => { Modulo($x, $y) }
29. [EliminateModulo]
    (Modulo (LiteralInt32 $x:*) (LiteralInt32 $y:*))
    => { Modulo($x, $y) }
30. [EliminateModulo]
    (Modulo (LiteralInt64 $x:*) (LiteralInt64 $y:*))
    => { Modulo($x, $y) }
31. [EliminateIntegerDivide]
    (IntegerDivide (LiteralInt32 $x:*) (LiteralInt32 $y:*))
    => { IntegerDivide($x, $y) }
32. [EliminateIntegerDivide]
    (IntegerDivide (LiteralInt64 $x:*) (LiteralInt64 $y:*))
    => { IntegerDivide($x, $y) }

Constant-folding patterns for string operators:

1. [EliminateStrLength]
   (StrLength (LiteralString $x:*)) => (LiteralInt32 { $x.Length })
2. [EliminateStrConcat]
   $x:(StrConcat * $z:*)
   { $z.Count = = 1
   && $x.Delimiter.Type = = QilNodeType.LiteralString
   && ((QilLiteral)$x.Delimiter).ReadStringValue( ).Length = = 0
   && ((QilNode)$z[0]).QilType.IsSingleton } => { (QilNode)$z[0] }

Constant-folding patterns for value comparison operators:

1. [EliminateEq]
   (Eq $x:(LiteralQName * * *) $y:(LiteralQName * * *))
   => (Boolean { $x.Equals($y) })
2. [EliminateEq]
   (Eq $x:(LiteralString *) $y:(LiteralString *))
   => (Boolean { $x.Equals($y) })
3. [EliminateEq]
   (Eq (LiteralDecimal $x:*) (LiteralDecimal $y:*))
   => (Boolean { $x = = $y })
4. [EliminateEq]
   (Eq (LiteralDouble $x:*) (LiteralDouble $y:*))
   => (Boolean { $x = = $y })
5. [EliminateEq]
   (Eq (LiteralFloat $x:*) (LiteralFloat $y:*))
   => (Boolean { $x = = $y })
6. [EliminateEq]
   (Eq (LiteralInt64 $x:*) (LiteralInt64 $y:*))
   => (Boolean { $x = = $y })
7. [EliminateEq]
   (Eq (LiteralInt32 $x:*) (LiteralInt32 $y:*))
   => (Boolean { $x = = $y })
8. [EliminateNe]
   (Ne $x:(LiteralQName * * *) $y:(LiteralQName * * *))
   => (Boolean { !$x.Equals($y)})
9. [EliminateNe]
   (Ne $x:(LiteralString *) $y:(LiteralString *))
   => (Boolean { !$x.Equals($y) } )
10. [EliminateNe]
    (Ne (LiteralDecimal $x:*) (LiteralDecimal $y:*))
    => (Boolean { $x != $y })
11. [EliminateNe]
    (Ne (LiteralDouble $x:*) (LiteralDouble $y:*))
    => (Boolean { $x != $y })
12. [EliminateNe]
    (Ne (LiteralFloat $x:*) (LiteralFloat $y:*))
    => (Boolean { $x != $y })
13. [EliminateNe]
    (Ne (LiteralInt64 $x:*) (LiteralInt64 $y:*))
    => (Boolean { $x != $y })
14. [EliminateNe]
    (Ne (LiteralInt32 $x:*) (LiteralInt32 $y:*))
    => (Boolean { $x != $y })
15. [EliminateGt]
    (Gt (LiteralDecimal $x:*) (LiteralDecimal $y:*))
    => (Boolean { $x > $y })

-continued

Exemplary Constant Folding Type Optimizations

16. [EliminateGt]
    (Gt (LiteralDouble $x:*) (LiteralDouble $y:*))
    => (Boolean { $x > $y })
17. [EliminateGt]
    (Gt (LiteralFloat $x:*) (LiteralFloat $y:*))
    => (Boolean { $x > $y })
18. [EliminateGt]
    (Gt (LiteralInt64 $x:*) (LiteralInt64 $y:*))
    => (Boolean { $x > $y })
19. [EliminateGt]
    (Gt (LiteralInt32 $x:*) (LiteralInt32 $y:*))
    => (Boolean { $x > $y })
20. [EliminateGe]
    (Ge (LiteralDecimal $x:*) (LiteralDecimal $y:*))
    => (Boolean { $x >= $y })
21. [EliminateGe]
    (Ge (LiteralDouble $x:*) (LiteralDouble $y:*))
    => (Boolean { $x >= $y })
22. [EliminateGe]
    (Ge (LiteralFloat $x:*) (LiteralFloat $y:*))
    => (Boolean { $x >= $y })
23. [EliminateGe]
    (Ge (LiteralInt64 $x:*) (LiteralInt64 $y:*))
    => (Boolean { $x >= $y })
24. [EliminateGe]
    (Ge (LiteralInt32 $x:*) (LiteralInt32 $y:*))
    => (Boolean { $x >= $y })
25. [EliminateLt]
    (Lt (LiteralDecimal $x:*) (LiteralDecimal $y:*))
    => (Boolean { $x < $y })
26. [EliminateLt]
    (Lt (LiteralDouble $x:*) (LiteralDouble $y:*))
    => (Boolean { $x < $y })
27. [EliminateLt]
    (Lt (LiteralFloat $x:*) (LiteralFloat $y:*))
    => (Boolean { $x < $y })
28. [EliminateLt]
    (Lt (LiteralInt64 $x:*) (LiteralInt64 $y:*))
    => (Boolean { $x < $y })
29. [EliminateLt]
    (Lt (LiteralInt32 $x:*) (LiteralInt32 $y:*))
    => (Boolean { $x < $y })
30. [EliminateLe]
    (Le (LiteralDecimal $x:*) (LiteralDecimal $y:*))
    => (Boolean { $x <= $y })
31. [EliminateLe]
    (Le (LiteralDouble $x:*) (LiteralDouble $y:*))
    => (Boolean { $x <= $y })
32. [EliminateLe]
    (Le (LiteralFloat $x:*) (LiteralFloat $y:*))
    => (Boolean { $x <= $y })
33. [EliminateLe]
    (Le (LiteralInt64 $x:*) (LiteralInt64 $y:*))
    => (Boolean { $x <= $y })
34. [EliminateLe]
    (Le (LiteralInt32 $x:*) (LiteralInt32 $y:*))
    => (Boolean { $x <= $y })

Constant-folding patterns for XML node properties:

1. [EliminateNameOf]
   (NameOf (ElementCtor $name:* *)) => $name
2. [EliminateNameOf]
   (NameOf (Let (ElementCtor $name:* *))) => $name
3. [EliminateNameOf]
   (NameOf (For (ElementCtor $name:* *))) => $name
4. [EliminateNameOf]
   (NameOf (AttributeCtor $name:* *)) => $name
5. [EliminateNameOf]
   (NameOf (Let (AttributeCtor $name:* *))) => $name
6. [EliminateNameOf]
   (NameOf (For (AttributeCtor $name:* *))) => $name
7. [EliminateNameOf]
   (NameOf (CommentCtor *)) =>
8. [EliminateNameOf]
   (NameOf (Let (CommentCtor *))) =>
9. [EliminateNameOf]
   (NameOf (For (CommentCtor *))) =>

-continued

| Exemplary Constant Folding Type Optimizations |
|---|

10. [EliminateNameOf]
    (NameOf (PICtor * *)) =>
11. [EliminateNameOf]
    (NameOf (Let (PICtor * *))) =>
12. [EliminateNameOf]
    (NameOf (For (PICtor * *))) =>
13. [EliminateNameOf]
    (NameOf (TextCtor *)) =>
14. [EliminateNameOf]
    (NameOf (Let (TextCtor *))) =>
15. [EliminateNameOf]
    (NameOf (For (TextCtor *))) =>
16. [EliminateNameOf]
    (NameOf (DocumentCtor *)) =>
17. [EliminateNameOf]
    (NameOf (Let (DocumentCtor *))) =>
18. [EliminateNameOf]
    (NameOf (For (DocumentCtor *))) =>
19. [EliminateLocalNameOf]
    (LocalNameOf (ElementCtor $name:* *))
    => (LiteralString { $name.LocalName })
20. [EliminateLocalNameOf]
    (LocalNameOf (Let (ElementCtor $name:* *)))
    => (LiteralString { $name.LocalName })
21. [EliminateLocalNameOf]
    (LocalNameOf (For (ElementCtor $name:* *)))
    => (LiteralString { $name.LocalName })
22. [EliminateLocalNameOf]
    (LocalNameOf (AttributeCtor $name:* *))
    => (LiteralString { $name.LocalName })
23. [EliminateLocalNameOf]
    (LocalNameOf (Let (AttributeCtor $name:* *)))
    => (LiteralString { $name.LocalName })
24. [EliminateLocalNameOf]
    (LocalNameOf (For (AttributeCtor $name:* *)))
    => (LiteralString { $name.LocalName })
25. [EliminateLocalNameOf]
    (LocalNameOf (CommentCtor *)) =>
26. [EliminateLocalNameOf]
    (LocalNameOf (Let (CommentCtor *))) =>
27. [EliminateLocalNameOf]
    (LocalNameOf (For (CommentCtor *))) =>
28. [EliminateLocalNameOf]
    (LocalNameOf (PICtor * *)) =>
29. [EliminateLocalNameOf]
    (LocalNameOf (Let (PICtor * *))) =>
30. [EliminateLocalNameOf]
    (LocalNameOf (For (PICtor * *))) =>
31. [EliminateLocalNameOf]
    (LocalNameOf (TextCtor *)) =>
32. [EliminateLocalNameOf]
    (LocalNameOf (Let (TextCtor *))) =>
33. [EliminateLocalNameOf]
    (LocalNameOf (For (TextCtor *))) =>
34. [EliminateLocalNameOf]
    (LocalNameOf (DocumentCtor *)) =>
35. [EliminateLocalNameOf]
    (LocalNameOf (Let (DocumentCtor *))) =>
36. [EliminateLocalNameOf]
    (LocalNameOf (For (DocumentCtor *))) =>
37. [EliminateNamespaceUriOf]
    (NamespaceUriOf (ElementCtor $name:* *))
    => (LiteralString { $name.NamespaceURI })
38. [EliminateNamespaceUriOf]
    (NamespaceUriOf (Let (ElementCtor $name:* *)))
    => (LiteralString { $name.NamespaceURI })
39. [EliminateNamespaceUriOf]
    (NamespaceUriOf (For (ElementCtor $name:* *)))
    => (LiteralString { $name.NamespaceURI })
40. [EliminateNamespaceUriOf]
    (NamespaceUriOf (AttributeCtor $name:* *))
    => (LiteralString { $name.NamespaceURI })
41. [EliminateNamespaceUriOf]
    (NamespaceUriOf (Let (AttributeCtor $name:* *)))
    => (LiteralString { $name.NamespaceURI })

-continued

Exemplary Constant Folding Type Optimizations

42. [EliminateNamespaceUriOf]
    (NamespaceUriOf (For (AttributeCtor $name:* *)))
    => (LiteralString { $name.NamespaceURI })
43. [EliminateNamespaceUriOf]
    (NamespaceUriOf (CommentCtor *)) =>
44. [EliminateNamespaceUriOf]
    (NamespaceUriOf (Let (CommentCtor *))) =>
45. [EliminateNamespaceUriOf]
    (NamespaceUriOf (For (CommentCtor *))) =>
46. [EliminateNamespaceUriOf]
    (NamespaceUriOf (PICtor * *)) =>
47. [EliminateNamespaceUriOf]
    (NamespaceUriOf (Let (PICtor * *))) =>
48. [EliminateNamespaceUriOf]
    (NamespaceUriOf (For (PICtor * *))) =>
49. [EliminateNamespaceUriOf]
    (NamespaceUriOf (TextCtor *)) =>
50. [EliminateNamespaceUriOf]
    (NamespaceUriOf (Let (TextCtor *))) =>
51. [EliminateNamespaceUriOf]
    (NamespaceUriOf (For (TextCtor *))) =>
52. [EliminateNamespaceUriOf]
    (NamespaceUriOf (DocumentCtor *)) =>
53. [EliminateNamespaceUriOf]
    (NamespaceUriOf (Let (DocumentCtor *))) =>
54. [EliminateNamespaceUriOf]
    (NamespaceUriOf (For (DocumentCtor *))) =>

Constant-folding patterns for type operators:

1. [EliminateIsEmpty]
   (IsEmpty $x:*) { $x.QilType.IsEmpty } => (True)
2. [EliminateIsEmpty]
   (IsEmpty $x:*) { ($x.QilType.Cardinality & QilCardinality.Zero)= =0 }
   => (False)

Constant-folding patterns for XPath operators:

1. [FoldXPathNodeValueCtor]
   (XPathNodeValue (AttributeCtor $name:* $content:*
   { IsConvertibleToString($content) } )) => { ConvertToString($content) }
2. [FoldXPathNodeValueCtor]
   (XPathNodeValue (For (AttributeCtor $name:* $content:*
   { IsConvertibleToString($content) } ))) => { ConvertToString($content) }
3. [FoldXPathNodeValueCtor]
   (XPathNodeValue (ElementCtor $name:* (TextCtor $content:*
   { IsConvertibleToString($content) } ))) => { ConvertToString($content) }
4. [FoldXPathNodeValueCtor]
   (XPathNodeValue (For (ElementCtor $name:* (TextCtor $content:*
   { IsConvertibleToString($content) } )))) => { ConvertToString($content) }
5. [FoldXPathNodeValueCtor]
   (XPathNodeValue (ElementCtor $name:* $content:*
   { IsConvertibleToString($content) } )) => { ConvertToString($content) }
6. [FoldXPathNodeValueCtor]
   (XPathNodeValue (For (ElementCtor $name:* $content:*
   { IsConvertibleToString($content) } ))) => { ConvertToString($content) }
7 [FoldXPathNodeValueCtor]
   (XPathNodeValue (TextCtor $content:*
   { IsConvertibleToString($content) } )) => { ConvertToString($content) }
8. [FoldXPathNodeValueCtor]
   (XPathNodeValue (For (TextCtor $content:*
   { IsConvertibleToString($content) } ))) => { ConvertToString($content) }
9. [FoldXPathNodeValueCtor]
   (XPathNodeValue (NamespaceDecl * *)) => (LiteralString "")
10. FoldXPathNodeValueCtor]
    (XPathNodeValue (For (NamespaceDecl * *))) => (LiteralString "")

Logical rewrite patterns:

1. [FoldNotNot]
   (Not (Not $x:*)) => $x
2. [IntroduceNand]
   (Not (Or $x:* $y:*)) => (And (Not $x) (Not $y))
3. [FoldNotEq]
   (Not (Eq $x:* $y:*)) => (Ne $x $y)
4. [FoldNotNe]
   (Not (Ne $x:* $y:*)) => (Eq $x $y)
5. [FoldNotLt]
   (Not (Lt $x:* $y:*)) => (Ge $x $y)

| Exemplary Constant Folding Type Optimizations |
| --- |

6. [FoldNotLe]
   (Not (Le $x:* $y:*)) => (Gt $x $y)
7. [FoldNotGt]
   (Not (Gt $x:* $y:*)) => (Le $x $y)
8. [FoldNotGe]
   (Not (Ge $x:* $y:*)) => (Lt $x $y)
9. [FoldNotIs]
   (Not (Is $x:* $y:*)) => (IsNot $x:* $y:*)
10. [FoldNotIsNot]
    (Not (IsNot $x:* $y:*)) => (Is $x $y)
11. [FoldConditionalNot]
    (Conditional (Not $x:*) $true:* $false:*) => (Conditional $x $false $true)
12. [EliminateConditional]
    (Conditional (IsEmpty $x:*) $y:(List) { $y.QilType.IsEmpty }
    $z:* { $z == $x }) => $x
13. [FoldBooleanEquality]
    (Eq (True) $x:*) => $x
14. [FoldBooleanEquality]
    (Eq (False) $x:*) => (Not $x)
15. [FoldBooleanEquality]
    (Eq $x:* (True)) => $x
16. [FoldBooleanEquality]
    (Eq $x:* (False)) => (Not $x)
17. [FoldBooleanEquality]
    (Eq $x:* $y:*) { $x.QilType.IsBoolean && $y.QilType.IsBoolean }
    => (Or (And $x $y) (And (Not $x) (Not $y)))
18. [FoldBooleanInquality]
    (Ne (True) $x:*) => (Not $x)
19. [FoldBooleanInquality]
    (Ne (False) $x:*) => $x
20. [FoldBooleanInquality]
    (Ne $x:* (True)) => (Not $x)
21. [FoldBooleanInquality]
    (Ne $x:* (False)) => $x
22. [FoldBooleanInquality]
    (Ne $x:* $y:*) { $x.QilType.IsBoolean && $y.QilType.IsBoolean }
    => (Or (And $x (Not $y)) (And (Not $x) $y))
23. [IntroduceExists]
    (Gt (Length $x:*) (LiteralInt32 0)) => (Not (IsEmpty $x))
24. [IntroduceExists]
    (Ne (Length $x:*) (LiteralInt32 0)) => (Not (IsEmpty $x))
25. [IntroduceIsEmpty]
    (Eq (Length $x:*) (LiteralInt32 0)) => (IsEmpty $x)
26. [IntroduceIsEmpty]
    (Le (Length $x:*) (LiteralInt32 0)) => (IsEmpty $x)
27. [ConstrainLength] #Use the constraint that Length >= 0
    (Ge (Length $x:*) (LiteralInt32 0)) => (True)
28. [ConstrainLength] #Use the constraint that Length >= 0
    (Lt (Length $x:*) (LiteralInt32 0)) => (False)

Basic path rewrite patterns:

1. # Should be (Content (DocumentCtor $content:*)) => $content
   [FoldContentDocumentCtor]
   $x:(Content (DocumentCtor $content:*))
   => (FixupNavigation $x, $content)
2. [FoldContentDocumentCtor]
   $x:(Content (For (DocumentCtor $content:*)))
   => { FixupNavigation($x, $content) }
3. # Should be (Content (ElementCtor $content:*)) => $content
   [FoldContentElementCtor]
   $x:(Content (ElementCtor * $content:*))
   => { FixupNavigation($x, $content) }
4. [FoldContentElementCtor]
   $x:(Content (For (ElementCtor * $content:*)))
   => { FixupNavigation($x, $content) }
5. [CommuteContentTuple]
   (Content (Tuple $for:* $w:* $r:*)) => (Tuple $for $w (Content $r))
6. [FoldContentAttributeCtor]
   (Content (AttributeCtor * *)) => (List)
7. [FoldContentAttributeCtor]
   (Content (For (AttributeCtor * *))) => (List)

Other path rewrite patterns:

1. [EliminateParent]
   (Parent (For (Content $x:*))) => $x
2. [EliminateSelf]
   (Self $x:*) => $x -continued Exemplary Constant Folding Type Optimizations 3. [EliminateDescendantOrSelf]
(DescendantOrSelf (For$x:*) { IsConstructed2($x) }
=> { EvaluateDescendantOrSelf($x) }
4. [EliminateXPathDescendant]
$d:(XPathDescendant (For $x:*)) { IsConstructed2($x) }
=> {
QilList list = f.List( );
list.QilType = f.TypeFactory.Sequence($d.Type, QilCardinality.Zero);
} { EvaluateDescendant($x, list }

Loop invariant rewrite patterns:

1. [EliminateTuple]
(Tuple $i:(For $b:*) $w:* $r:*) { $r == $i && !DependsOn($w, $i) }
=> (Conditional $w $b (List))
2. [EliminateTuple]
(Tuple $i:(For $b:*) { $b.QilType.IsSingleton } $w:* $r:*) { !DependsOn($w, $i) &&
!DependsOn($r, $i) }
=> (Conditional $w $r (List))
3. [EliminateTuple]
(Tuple $i:(For $b:*) $w:* $r:*)
{ !DependsOn($w, $i) && !DependsOn($r, $i) }
=> (Conditional $w (NTimes $r (Length $b)) (List))
4. [IntroduceNTimes]
(Tuple $i:* $w:* $r:*) { !DependsOn($r, $i) }
=> (NTimes $r (Length (Tuple $i $w $i)))

Tuple rewrite patterns:

1. [FoldTupleTuple]
(Tuple $f:(For *){$f.Binding.QilType.IsSingleton}
                $x:* { !DependsOn($x, $f) }
                $t:(Tuple $g:(For *){ ((QilIterator)$g).Binding == $f }
                    $w:*
                    $r:*){ !DependsOn($w, $f) && !DependsOn($r, $f) })
=> {
        $g.Binding = $f.Binding;
        ((QilTuple)$t).Where = f.And($x, $w);
        }
        $t
2. [MiscCollapseTuple]
(Tuple $i:* $w:* (Tuple $j:(Let $binding:*) $x:* $k:*)
{ $j == $k }) => (Tuple $i (And $w $x) $binding)
3. [FoldTupleConditional]
(Tuple $i:* $w:* (Conditional $cond:* $return:* $list:(List)
                { $list.QilType.IsEmpty }))
=> (Tuple $i (And $w $cond) $return)
4. [FoldTupleConditional]
(Tuple $i:* $w:* (Conditional $cond:* $list:(List)
                { $list.QilType.IsEmpty } $return:*))
=> (Tuple $i (And $w (Not $cond)) $return)
5. [EliminateReturn]
$x:(IsEmpty $t:(Tuple * * *))
=> {
        QilTuple t = (QilTuple)$t;
        while (t.For.Type != QilNodeType.Let
            && t.Return.Type == QilNodeType.Tuple)
            t = (QilTuple)t.Return;
        if (t.For.Type != QilNodeType.Let &&
          !(t.Return is QilIterator) && t.Return.QilType.IsSingleton) {
            t.Return = t.For;
            return Replace($0.EliminateReturn, $x, f.IsEmpty($t), true);
        }
    }
6. [IntroduceList]
(Tuple * (False) *) => (List)
7. [IntroduceList]
(Tuple * * $list:(List) { $list.QilType.IsEmpty } )=> $list
8. [IntroduceList]
(Tuple (For $list:(List) { $list.QilType.IsEmpty } ) * *)=> $list
9. [EliminateTuple]
(Tuple $i:(For $x:*) (True) $j:*) { $i == $j } => $x
10. [EliminateTuple]
(Tuple $i:(Let $x:*) (True) $j:*) { $i == $j } => $x
11. [EliminateNTimes]
(DocOrderDistinct $t:(Tuple * * *))
=> {
    QilTuple last = $t.LastTuple;
    if (last.Return.Type == QilNodeType.NTimes) {

-continued

Exemplary Constant Folding Type Optimizations

```
            QilBinary ntimes = (QilBinary)last.Return;
            QilList list = f.List( );
            list.Type = f.TypeFactory.Sequence(QilCardinality.Zero, ntimes.Type);
            last.Return = Replace($0.EliminateNTimes, ntimes,
                f.Conditional(f.Gt(ntimes.Right, f.Int32(0)), ntimes.Left, list));
        }
    }
```
Position rewrite Patterns:

1. [EliminatePositionOf]
   (PositionOf (Let *)) => (LiteralInt32 1)
2. [EliminatePositionOf]
   (PositionOf (For $x:*) { $x.QilType.IsSingleton } ) => (LiteralInt32 1)
3. [ConstrainPositionOf]
   (Ge (PositionOf *) (LiteralInt32 1)) => (True)
4. [ConstrainPositionOf]
   (Lt (PositionOf *) (LiteralInt32 1)) => (False)
5. [ConstrainPositionOf]
   (Gt $p: (PositionOf *) $one:(LiteralInt32 1)) => (Ne $p $one)
6. [ConstraintPositionOf]
   (Le $p:(PositionOf *) $one:(LiteralInt32 1)) => (Eq $p $one)

Commutation patterns

1. [CommuteIsEmptyList]
   ```
   $x:(IsEmpty $list:(List *)) => {
       QilNode result = f.True( );
       foreach (QilNode member in ((QilList)$list)) {
           if (member.QilType.IsEmpty) {
               // contributes nothing
           }
           else if ((member.QilType.Cardinality & QilCardinality.Zero) == 0) {
               // whole List is non-empty
               return Replace($0.CommuteIsEmptyList, $x, f.False( ));
           }
           else {
               result = f.And(result, f.IsEmpty(member));
           }
       }
       return Replace($0.CommuteIsEmptyList, $x, result, true);
   }
   ```
2. [CommuteXPathNodeValueList]
   ```
   $x:(XPathNodeValue $members:(List *)) => {
       bool fSuccess = true;
       QilStrConcat result = f.StrConcat( );
       foreach (QilNode member in ((QilList)$members)) {
           if (!IsConvertibleToString(member)) {
               fSuccess = false;
               break;
           }
           else
               result. Add(ConvertToString(member));
       }
       if (fSuccess)
           return Replace($0.CommuteXPathNodeValueList, $x, result, true);
   }
   ```
3. [CommuteIsEmptyTuple]
   (IsEmpty (Tuple * (False) *)) => (True)
4. [CommuteSetIsEmptyTuple]
   (IsEmpty (Tuple $i:* $w:* $r:*))
   { !DependsOn($w, $i) && !DependsOn($r, $i) }
   => (Or (Not $w) (IsEmpty $r))
5. [CommuteIsEmptyConditional]
   (IsEmpty (Conditional $cond:* $true:* $false:*))
   => (Conditional $cond (IsEmpty $true) (IsEmpty $false))
6. [CommuteTupleTuple]
   ```
   $outer:(Tuple
           $ai:(For $inner:(Tuple $bi:* $bw:* $br:*)) $aw:* $ar:*)
   => {
       // (Tuple $$bi $$bw (Tuple (For $$br) $$aw $$ar))
       // Avoid having to push substitutions:
       $ai.Binding = $br;
       ((QilTuple)$inner).Return = f.Tuple($ai, $aw, $ar);
       return Replace($0.CommuteTupleTuple, $outer, $inner, true);
   }
   ```

-continued

Exemplary Constant Folding Type Optimizations

```
7. [CommuteTupleList]
    $t:(Tuple $i:(For $list:(List *)) $w:* $r:*) => {
        QilList result = f.List( );
        foreach (QilNode member in ((QilList)$list)) {
            QilIterator j = f.For(member);
            PushSubstitution($i, j);
            result.Add(f.Tuple(j, Clone($w), Clone($r)));
        }
        return Replace($0.CommuteTupleList, $t, result, true);
    }
8. [CommuteTupleConditional]
    $t:(Tuple $i:(For (Conditional $cond:* $true:*
        list:(List) {$list.QilType.IsEmpty})) $w:* $r:*) => {
        // (Tuple (For $$true) (And $$w $$cond) $$r)
        // avoid having to push substitutions
        $i.Binding = $true;
        return Replace($0.CommuteTupleConditional, $t,
                f.Tuple($i, f.And($w, $cond), $r), true);
    }
9. [CommuteTupleConditional]
    $t:(Tuple $i:(For (Conditional $cond:*
                $list:(List){$list.QilType.IsEmpty} $false:*)) $w:* $r:*)
    => {
        // (Tuple (For $$false) (And $$w (Not $$cond)) $$r)
        // avoid having to push substitutions
        $i.Binding = $false;
        return Replace($0.CommuteTupleConditional, $t,
                f.Tuple($i, f.And($w, f.Not($cond)), $r), true);
    }
10. [CommuteDocOrderDistinctConditional]
    (DocOrderDistinct (Conditional $cond:* $true:* $false:*))
    => (Conditional $cond (DocOrderDistinct $true) (DocOrderDistinct $false))
```

Type folding patterns:

```
1. [EliminateIsType]
    (IsType $x:* $t:*) { TypesMatch($x.QilType, $t) } => (True)
2. [EliminateIsType]
    (IsType $x:* $t:*) { TypesDontMatch($x.QilType, $t) } => (False)
3. [EliminateConvert]
    (Convert $x:* $t:*) { $x.QilType = = $t } => $x
```

Sort elimination/grouping patterns:

```
1. [EliminateDocOrderDistinct]
    (DocOrderDistinct $x:*) { IsConstructed($x) } => $x
2. [EliminateDocOrderDistinct]
    (DocOrderDistinct $t:(OldTuple * * *))
    { IsConstructed($t.LastTuple.Return) } => $t
3. [EliminateDocOrderDistinct]
    (DocOrderDistinct $x:(List)) { $x.QilType.IsEmpty }) => $x
4. [EliminateSort]
    (Sort (For $x:(List) { $x.QilType.IsEmpty }) *) => $x
```

What is claimed:

1. A method for constructing an optimal representation for an input query, the method comprising:

receiving the input query, wherein the input query is an intermediate language representation comprising nodes, each node having a respective node type;

examining the nodes in a left-depth first manner to identify node types for optimization; tagging nodes corresponding to the identified node types;

moving upward to the next node until the intermediate language representation of the input query has been examined in its entirety;

searching from the top of the intermediate language representation for tagged nodes and identifying code patterns to be optimized; and adjusting the identified code patterns with improved code patterns to form an optimal representation for the input query, wherein the improved code patterns are generated using one or more translations comprising at least one of constant folding, logical rewrites, path rewrites, loop-invariant code rewrites, tuple rewrites, position rewrites, commutations. inlining and sort elimination.

2. The method of claim 1, wherein the receiving step comprises receiving a semantic intermediate language representation.

3. The method of claim 2, wherein the semantic representation comprises a graph structure containing nodes.

4. A computer-readable medium having computer-executable instructions executed by a processor for performing a method for constructing an optimal representation for an input query, the method comprising:

receiving the input query, wherein the input query is an intermediate language representation containing code patterns and nodes, each node having a respective node type;

examining the nodes in a left-depth first manner to identify code patterns and node types which are subjects for optimization;

tagging the identified code patterns until the intermediate language representation of the input query has been examined in its entirety;

searching from the top of the intermediate language representation for tagged code patterns; and adjusting the tagged code patterns with improved code patterns to form an optimal representation for an input query, wherein the improved code patterns are generated using one or more translations comprising at least one of constant folding, logical rewrites, path rewrites, loop-invariant code rewrites, tuple rewrites, position rewrites, commutations, inlining and sort elimination.

5. A computer system for generating an optimized representation of an XML intermediate language representation of one or more of input queries comprising:

one or more of input devices for receiving the one or more input queries;

one or more intermediate language compilers wherein each compiler generates an intermediate language representation of an input query;

an expression accumulator which combines each intermediate language representation into a single XML intermediate language representation; and an optimizer performing the acts of:
receiving the input query, wherein the input query is an intermediate language representation containing code patterns and nodes, each node having a respective node type;

examining the nodes in a left-depth first manner to identify code patterns and node types which are subjects for optimization;

tagging the identified code patterns until the intermediate language representation of the input query has been examined in its entirety;

searching from the top of the intermediate language representation for tagged code patterns; and adjusting the tagged code patterns with improved code patterns to form an optimal representation for an input query, wherein the improved code patterns are generated using one or more translations comprising at least one of constant folding, logical rewrites, path rewrites, loop-invariant code rewrites. tuple rewrites, position rewrites, commutations, inlining and sort elimination.

6. The system of claim 5, wherein the one or more input queries comprise one or more of an XML query and an XML view.

7. The system of claim 5, further containing a post-optimization process portion forming query results, the system comprising:

one or more target generators wherein the optimized representation is transformed into one or more target representations forming target queries;

one or more data sources for querying over; and one or more execution engines wherein the target queries are executed over the one or more data sources to produce query results.

8. A method for constructing an optimal representation for an input query, the method comprising:

receiving the input query, wherein the input query is an intermediate language representation containing nodes, each node having a respective node type;

examining the nodes to inspect code patterns associated with respective node types;

comparing the inspected code patterns using a pattern match algorithm to detect non-optimized code patterns; and adjusting one or more of the non-optimized code patterns and the inspected code patterns with improved code patterns to form an optimal representation for an input query, wherein the improved code patterns are generated using one or more translations comprising at least one of constant folding, logical rewrites, path rewrites, loop-invariant code rewrites, tuple rewrites, position rewrites, commutations, inlining and sort elimination.

9. The method of claim 8, wherein the receiving step comprises receiving a semantic intermediate language representation.

10. The method of claim 9, wherein the semantic representation comprises a graph structure containing nodes.

11. A computer-readable medium having computer-executable instructions executed by a processor for performing a method for constructing an optimal representation for an input query, the method comprising:

receiving the input query, wherein the input query is an intermediate language representation containing nodes, each node having a respective node type;

examining the nodes to inspect code patterns associated with respective node types; comparing the inspected code patterns using a pattern match algorithm to detect non-optimized code patterns; and adjusting one or more of the non-optimized code patterns and the inspected code patterns with improved code patterns to form an optimal representation for an input query, wherein the improved code patterns are generated using one or more translations comprising at least one of constant folding, logical rewrites, path rewrites, loop-invariant code, tuple rewrites, position rewrites, commutations, inlining and sort elimination.

12. A computer system for generating an optimized representation of an XML intermediate language representation of one or more of input queries comprising:

one or more of input devices for receiving the one or more input queries;

one or more intermediate language compilers wherein each compiler generates an intermediate language representation of an input query;

an expression accumulator which combines each intermediate language representation into a single XML intermediate language representation; and an optimizer performing the acts of:
receiving the input query, wherein the input query is an intermediate language representation containing nodes, each node having a respective node type;

examining the nodes to inspect code patterns associated with respective node types;

comparing the inspected code patterns using a pattern match algorithm to detect non-optimized code patterns; and adjusting one or more of the non-optimized code patterns and the inspected code patterns with improved code patterns to form an optimal representation for an input query, wherein the improved code patterns are generated using one or more translations comprising at least one of constant folding, logical rewrites, path rewrites, loop-invariant code, tuple rewrites, position rewrites, commutations, inlining and sort elimination.

* * * * *